US010012737B2

(12) United States Patent
Van Den Bossche

(10) Patent No.: US 10,012,737 B2
(45) Date of Patent: Jul. 3, 2018

(54) METHOD FOR ESTIMATING THE LEVEL OF ERROR IN SATELLITE GEOLOCATION MEASUREMENTS AND FOR MONITORING THE RELIABILITY OF SAID ESTIMATIONS AND ASSOCIATED DEVICE

(71) Applicant: THALES, Courbevoie (FR)

(72) Inventor: Mathias Van Den Bossche, Goyrans (FR)

(73) Assignee: THALES, Courbevoie (FR)

( * ) Notice: Subject to any disclaimer, the term of this patent is extended or adjusted under 35 U.S.C. 154(b) by 166 days.

(21) Appl. No.: 14/443,324

(22) PCT Filed: Nov. 15, 2013

(86) PCT No.: PCT/EP2013/073983
§ 371 (c)(1),
(2) Date: May 15, 2015

(87) PCT Pub. No.: WO2014/076254
PCT Pub. Date: May 22, 2014

(65) Prior Publication Data
US 2015/0355339 A1    Dec. 10, 2015

(30) Foreign Application Priority Data
Nov. 16, 2012    (FR) ...................................... 12 03073

(51) Int. Cl.
*G01S 19/42*    (2010.01)
*G01S 19/20*    (2010.01)
(Continued)

(52) U.S. Cl.
CPC .............. *G01S 19/24* (2013.01); *G01S 19/20* (2013.01); *G01S 19/22* (2013.01)

(58) Field of Classification Search
CPC .......... G01S 19/24; G01S 19/22; G01S 19/23; G01S 19/17; G01S 19/20; G01S 19/48; G01S 19/08; G01S 19/02; G01S 5/009
(Continued)

(56) References Cited

U.S. PATENT DOCUMENTS 5,600,329 A * 2/1997 Brenner ................... G01S 5/009
340/979
6,151,551 A * 11/2000 Geier ....................... G01S 19/17
340/425.5
(Continued)

FOREIGN PATENT DOCUMENTS

EP    1 637 899 A1    3/2006
JP    H11-83978 A    3/1999
(Continued)

OTHER PUBLICATIONS

Walter, T. et al., "Weighted RAIM for Precision Approach", Proceedings of Institute of Navigation (ION) GPS-94, 1995, pp. 1-10.
(Continued)

Primary Examiner — Bernarr E Gregory
Assistant Examiner — Nuzhat Pervin
(74) Attorney, Agent, or Firm — Baker & Hostetler LLP

(57) ABSTRACT

In the field of satellite global navigation, a method is provided for estimating the level of error in global navigation satellite measurements and for ensuring the reliability of these estimations, implemented by a global navigation device in which local errors are detected by said global navigation device and errors associated with the satellites are detected by a ground segment.

16 Claims, 1 Drawing Sheet

(51) Int. Cl.
*G01S 19/22* (2010.01)
*G01S 19/24* (2010.01)

(58) Field of Classification Search
USPC .................................................. 342/357.61
See application file for complete search history.

(56) References Cited

U.S. PATENT DOCUMENTS

| | | | | |
|---|---|---|---|---|
| 6,847,893 B1* | 1/2005 | Lupash | ............. | G01S 19/20 |
| | | | | 340/970 |
| 7,095,369 B1* | 8/2006 | Clark | ............. | G01S 19/02 |
| | | | | 342/357.58 |
| 2005/0015680 A1* | 1/2005 | Rubin | ............. | G01S 19/08 |
| | | | | 714/47.2 |
| 2009/0128409 A1* | 5/2009 | Trautenberg | ............. | G01S 19/08 |
| | | | | 342/357.45 |
| 2010/0033370 A1* | 2/2010 | Lopez | ............. | G01S 19/08 |
| | | | | 342/357.29 |
| 2010/0289696 A1* | 11/2010 | Krueger | ............. | G01S 19/20 |
| | | | | 342/357.58 |
| 2011/0057834 A1* | 3/2011 | Miller | ............. | G01S 19/37 |
| | | | | 342/357.25 |
| 2012/0019411 A1* | 1/2012 | Trautenberg | ............. | G01S 19/20 |
| | | | | 342/357.24 |
| 2012/0146851 A1* | 6/2012 | Fernandez | ............. | G01S 19/02 |
| | | | | 342/357.58 |
| 2013/0030775 A1* | 1/2013 | Clemenceau | ............. | G01S 19/48 |
| | | | | 703/2 |

FOREIGN PATENT DOCUMENTS

| | | |
|---|---|---|
| JP | 2006-242662 A | 9/2006 |
| WO | 9839722 A1 | 9/1998 |
| WO | 02/48812 A2 | 6/2002 |

OTHER PUBLICATIONS

Australian Office Action for AU2013346734.

Todd Walter, et al., "Weighted RAM for Precision Approach", Proceedings of the Institute of Navigation, Sep. 1, 1995, pp. 1995-2004, XP002351332.

Theodor Zink et al., Analyses of Integrity Monitoring Techniques for a Global Navigation Satellite System (GNSS-2), ION Annual Meeting, Jun. 26, 2000, pp. 117-127, XP002343913.

Greg Johnson, et al., "Low Cost Multipath Mitigation in a Single Frequency Environment for a DGPS Station", Proceedings of the 1996 National Technical Meeting of the Institute of Navigation, Jan. 24, 1996, pp. 899-904, XP056005695.

M.E. Cannon, et al., "Analysis of a High-Performance C/A—Code GPS Receiver in Kinematic Mode", Institute of Navigation, Dec. 1, 1992, pp. 285-300, vol. 39, No. 3, XP056004132.

Myungjun Choi, et al., "Demonstrations of Multi-Constellation Advanced RAIM for Vertical Guidance Using GPS and GLONASS Signals", Proceedings of the 24th International Technical Meeting of the Satellite Division of the Institute of Navigation, Sep. 23, 2011, p. 3227, XP056000690.

* cited by examiner

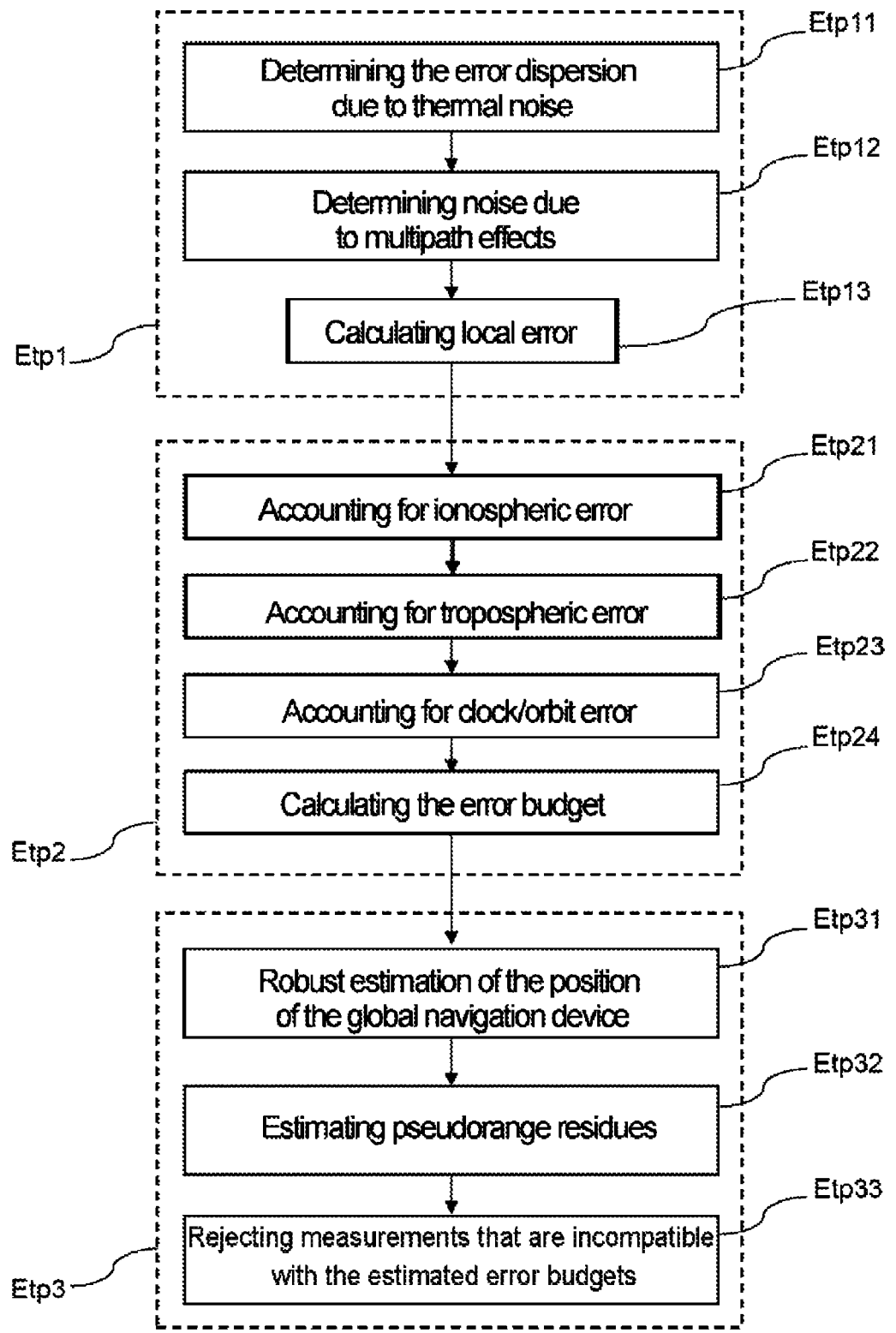

METHOD FOR ESTIMATING THE LEVEL OF ERROR IN SATELLITE GEOLOCATION MEASUREMENTS AND FOR MONITORING THE RELIABILITY OF SAID ESTIMATIONS AND ASSOCIATED DEVICE

CROSS-REFERENCE TO RELATED APPLICATIONS

This application is a National Stage of International patent application PCT/EP2013/073983, filed on Nov. 15, 2013, which claims priority to foreign French patent application No. FR 1203073, filed on Nov. 16, 2012, the disclosures of which are incorporated by reference in their entirety.

FIELD OF THE INVENTION

The present invention relates to the field of satellite global navigation. The present invention more particularly relates to a method for estimating the level of error in global navigation satellite measurements and for ensuring the reliability of these estimations, and to a global navigation device implementing this method.

BACKGROUND

Global navigation satellite devices, also referred to as global navigation satellite systems (GNSS), calculate the position of a receiver terminal by measuring the propagation time of signals emitted by navigation satellites between the satellites and the receiver terminal. The terminal then deduces therefrom the distances between the various satellites and the terminal.

Because the signal passes through the various layers of the atmosphere, the position estimated by the terminal is not always exact. It is known to introduce corrections into the system of calculations so as to account for this interference but the models used are complicated to define. In addition these models do not take into account the environment of the receiver terminal, such as multipath effects for example.

SUMMARY OF THE INVENTION

The aim of the present invention is to mitigate at least certain of the drawbacks of the prior art notably by providing a method allowing the level of measurement error induced by the environment to be quantified and the reliability of these estimations to be monitored.

For this purpose, one subject of the invention is a method for estimating and controlling the level of error in global navigation satellite measurements and for ensuring the reliability of these estimations, implemented by a global navigation device in which local errors are detected by said global navigation device and errors associated with the satellites are detected by a ground segment.

According to one variant implementation, the method comprises:
  a step Etp1 of estimating local errors $\sigma_{loc,i}$;
  a step Etp2 of constructing an error budget;
  a step Etp3 of monitoring the estimated error; and
  a step of calculating integrity parameters.

According to one variant implementation, step Etp1 of the method comprises:
  a step Etp11 of determining the error dispersion due to thermal noise;
  a step Etp12 of determining the noise due to multipath effects; and
  a step Etp13 of calculating local error.

According to one variant implementation, step Etp2 of the method comprises:
  a step Etp21 of accounting for ionospheric error;
  a step Etp22 of accounting for tropospheric error;
  a step Etp23 of accounting for orbit/clock error; and
  a step Etp23 of calculating the error budget.

According to one variant implementation, step Etp3 of the method comprises:
  a step Etp31 of estimating the position of the global navigation device;
  a step Etp32 of estimating pseudorange residues; and
  a step Etp33 of rejecting measurements incompatible with the estimated error budgets.

According to one variant implementation, the integrity parameters are calculated by defining a radius of protection that must be smaller than a preset threshold value.

According to one variant implementation, the integrity parameters are determined by calculating directly the risk of exceeding alarm values.

According to one variant implementation, the estimations of local errors are validated with a robust algorithm.

A second aim of the invention is to provide a satellite navigation device. For this purpose, another subject of the invention is a global navigation device able to implement the navigation method described above.

BRIEF DESCRIPTION OF THE DRAWINGS

Other particularities and advantages of the present invention will become more clearly apparent on reading the following description, given by way of nonlimiting illustration, and with reference to the appended drawing, in which:

FIG. 1 shows an example block flowchart illustrating the method according to the invention.

DETAILED DESCRIPTION

The present invention relates to a method for estimating and controlling integrity parameters for global navigation satellite measurements and for ensuring the reliability of these estimations. The method according to the invention will be described below by way of one particular nonlimiting aviation-related application.

The principle of the invention consists in using the global navigation device to detect local errors and in using a ground segment to detect errors associated with the satellites.

With reference to FIG. 1, the method according to the invention mainly comprises a first step Etp1 of estimating local errors, a step Etp2 of constructing the error budget, a step Etp3 of monitoring the estimated error, and a step of calculating integrity parameters.

The first step consists in estimating the error in local measurements specific to the environment of the receiver terminal of the global navigation satellite device at an instant t.

The receiver may be subject to electromagnetic interference. For example, if the receiver is near a radar, noise related to the emissions of this radar will be added to the received signals and therefore the measurements will be randomly contaminated with noise. The measurements may also be disrupted by thermal noise associated with the receiver. Below, the expression "thermal noise" will encompass both any electromagnetic interference in the environment of the receiver and the thermal noise specific to the receiver. The error due to the thermal noise is possibly determined depending on the technology implemented in the receiver terminal of the global navigation device. It will depend on the signal-to-noise ratio $C/N_0$.

The error dispersion due to thermal noise $\sigma_{noise}$ for the receiver terminal may be estimated at the time t, in a step Etp11, using a standard formula such as, for example:

$$\frac{\sigma_{noise}(t)}{T} = \frac{B_n}{2} \frac{C}{N_0}(t)$$

where T represents period and $B_n$ noise bandwidth.

According to another method of implementation, the error due to thermal noise may be estimated as a function of the uncorrelated portion of measurement fluctuations. For this purpose, an average of the square of the measurement differences between two consecutive measurements divided by $\sqrt{2}$ may be performed so as to isolate uncorrelated noises.

Before reaching the antenna of the receiver, the signal emitted by the global navigation satellite may also have been reflected from ground-level obstacles such as buildings for example. The receiver will therefore receive, at its receiver antenna, duplicates of signals that will possibly have been reflected one or more times in the environment. These signals will have travelled a path longer than a direct path and will disrupt the measurements. The error due to multipath effects may be evaluated, for example as a function of the code/carrier difference.

When a GNSS measurement is carried out, two types of the measurements may be made. A first measurement may be carried out by measuring the time that the code in which the parameters are encrypted takes to propagate, the propagation speed being the group velocity of the electromagnetic signal. Another measurement may consist in calculating the time that the carrier takes to propagate. To do this, Doppler shift is measured. Since the carrier propagates at the phase velocity of the electromagnetic signal, it is possible to deduce therefrom the distance between the receiver terminal and the satellite. To carry out these measurements, two different techniques may be used and different measurement qualities will be obtained. Since the codes are repeated over long periods, the phase of the code is unambiguous but contaminated with noise. In contrast, the phase of the carrier has a smaller length and will therefore be ambiguous but contaminated with very little noise. Since it is known that the noise that contaminates the code is due to multipath effects, one way of estimating multipath noise for a certain filtering time may consist in calculating the standard deviation of the deviation between the range of the code measurement and the carrier measurement. The error due to multipath effects may thus be evaluated in a step Etp12, for example using the following formula:

$$\sigma_{MP}^2(t) = \frac{1}{L}\sum_{i=0}^{L}[\varphi_{t-i} - \rho_{t-i}]^2 - \left[\frac{1}{L+1}\sum_{i=0}^{L}[\varphi_{t-i} - \rho_{t-i}]\right]^2$$

where L represents filtering time, typically a few tens of seconds, $\varphi_t$ ($\rho_t$, respectively) represents the phase of the carrier (of the code, respectively) at the time t, typically L is of the order of magnitude of the time that the receiver takes to converge on the estimation of the phase ambiguity using the code.

The estimation of local error may be carried out in a step Etp13 using the formula:

$$\sigma_{loc} = \sqrt{\sigma_{noise}^2 + \sigma_{MP}^2}$$

In the case of receiver terminals using a plurality of reception frequencies, the estimation is to be calculated for each frequency i separately. The preceding formula becomes:

$$\sigma_{loc,i} = \sqrt{\sigma_{noise,i}^2 + \sigma_{MP,i}^2}$$

Once the local errors have been estimated, the second step Etp2 of the method consists in complementing these estimations by accounting for other contributors in order to construct the error budget. These errors are essentially of two orders, atmospheric errors (tropospheric and ionospheric errors) and clock and orbit errors.

A substep Etp 21 consists in accounting for ionospheric error $\sigma_{iono}$. A first solution consists in using the correction values transmitted by the GNSS augmentation system or SBAS (for Satellite Based Augmentation System). The augmentation system observes the ionosphere, calculates the corrections required to account for the delay in the signal due to this layer of the atmosphere and then transmits them in grid form (GIVD for Grid Ionospheric Vertical Delay), accompanied with an indication of a confidence interval for each of these values (GIVE for Grid Ionospheric Vertical Error). The user, depending on his position, thus uses the correction value $\sigma_{GIVE}$ to be taken into account. Thus, a $\sigma_{iono} = \sigma_{GIVE}$. This solution is used with monofrequency navigation devices.

The problem is that the ionosphere is very nonuniform, this layer is therefore difficult to model and the values of the grid may be difficult to calculate. A second solution consists in using the fact that the amount by which an electromagnetic signal is delayed in this layer of the atmosphere depends on its frequency. The idea is to receive the signal at at least two different frequencies so that the receiver terminal can calculate its own ionospheric corrections by multifrequency combination. In this case, the contribution to the error budget is twofold. A first contribution $\sigma_{HOI}$ corresponds to higher-order ionospheric errors. The second contribution corresponds to a multiplicational factor that amplifies local errors. In the case of a bi-frequency receiver terminal, the pseudorange measurement taking into account ionospheric delay may be obtained using the formula:

$$\rho = \frac{\omega_1^2 \rho_1 - \omega_2^2 \rho_2}{\omega_1^2 - \omega_2^2}$$

where $\rho_1$ and $\rho_2$ represent the pseudorange measurements for the angular frequencies $\omega_1$ and $\omega_2$.

The estimation of ionospheric error consists in combining these two contributions. Thus, in the completely nonlimiting case of a bi-frequency receiver terminal, this error may be estimated using the formula:

$$\sigma_{ionofree} = \sqrt{\frac{\omega_1^4 \sigma_{loc,1}^2 + \omega_2^4 \sigma_{loc,2}^2}{(\omega_1^2 - \omega_2^2)^2} + \sigma_{HOI}^2}$$

where $\sigma_{loc,1}$ and $\sigma_{loc,2}$ represent the local errors for the angular frequencies $\omega_1$ and $\omega_2$ and $\sigma_{HOI}$ the higher-order errors.

An estimation of tropospheric errors is evaluated in a step Etp 22. Measurement of the delay due to propagation of the electromagnetic signal through this layer of the atmosphere is quite complicated. In addition, the receiver terminal generally does not have access to enough data for the user to estimate this delay. The error $\sigma_{Tropo}$ due to the troposphere must therefore be modeled. An estimation of this error may be obtained for example using a model available in the prior art.

When the influence of the troposphere may be estimated, i.e. when a sufficient number of GNSS (GPS, Galileo, Glonass, Compass, . . . ) satellites are available, this error $\sigma_{Tropo}$ may be extracted, for example, from covariances of the tropospheric estimation process.

Clock and orbit errors $\Delta X_{sat,n}$ are then taken into account in a step Etp 23. These errors are transmitted by the augmentation system SBAS in variance form. In the case of an augmentation system according to the MOPS-D standard, they may be available via the transmitted UDRE quantity (UDRE standing for User Differential Range Error).

Lastly a step Etp24 consists in establishing the error budget.

The variance of the total error in the pseudoranges is obtained by summing the variances of the various errors.

By way of example, for a monofrequency receiver terminal, using the parameters of an augmentation system complying to the MOPS-D standard, the variance in the total error may be obtained using the formula:

$$\sigma_{1F}^2 = \sigma_{loc}^2 + \sigma_{GIVE}^2 + \sigma_{Tropo}^2 + \sigma_{UDRE}^2$$

For a bi-frequency receiver terminal, the variance in the total error may be obtained using the formula:

$$\sigma_{2F}^2 = \frac{\omega_1^4 \sigma_{loc,1}^2 + \omega_2^4 \sigma_{loc,2}^2}{(\omega_1^2 - \omega_2^2)^2} + \sigma_{HOI}^2 + \sigma_{Tropo}^2 + \sigma_{UDRE}^2$$

Of course, this formula may be generalized to the case of a multifrequency receiver terminal.

This error budget gives the total error for one particular pseudorange measurement (line of sight). It is a question of the total error calculated on the basis of information collected for a given satellite seen by the receiver terminal. This variance may be estimated for each pseudorange measurement n that allows the position of the receiver terminal to be determined and will be denoted $\sigma_{sat,n}^2$ below.

Once the error budget has been calculated, the following step, Etp3, of the method consists in monitoring the estimated error.

In a first substep Etp31, the position of the receiver terminal of the global navigation device is calculated. This position is estimated by weighting the pseudorange measurements of the terminal using the covariances of the errors calculated in the preceding steps. Advantageously, these estimations are obtained by virtue of a robust algorithm, such as, for example and nonlimitingly, a Huber algorithm, able to detect substantial deviations relative to the estimated errors.

Conventionally, the position of the receiver is estimated by calculating its coordinates (longitude, latitude and altitude) using a least squares method. The problem is that this method uses an algorithm that is very sensitive to interference. Provided that the measurements are distributed with a Gaussian distribution, the algorithm functions correctly and the calculated positions are correct. When certain errors in the measurements performed diverge from a Gaussian distribution, the calculated positions deviate from the actual position proportionally to the measurement errors. Thus, one aberrant measurement may lead to an extremely large positional error.

In order to prevent this type of error, the method according to the invention does not use an algorithm based on least squares but a robust algorithm. The advantage of such an algorithm is that it detects aberrant measurements and eliminates them from the calculation, or attributes them very little weight. Advantageously, the weight attributed is decreased as measurement error increases.

The error budget is monitored in the following way. For each pseudorange measurement $\rho_n$, pseudorange residues $\Delta\rho$ are estimated in a step Etp32. These pseudorange residues are defined as the difference between the measurement, and the difference between the measured position $X_{sat,n}$ and the estimated position $X_{est}$.

$$\Delta\rho_n = \rho_n - \|\vec{X}_{sat,n} - \vec{X}_{est}\|$$

The fit of the variance $\sigma_{sat,n}^2$ is then evaluated. To do this, a threshold constant K is considered. This threshold value represents a parameter that sets the level of confidence in the error $\sigma_{sat,n}$, i.e. the probability of underestimating $\sigma_{sat,n}$ that would lead to a potentially erroneous position estimation.

If $\Delta\rho_n < K\sigma_{sat,n}$ the measurement is considered to be correct and is retained.

If $\Delta\rho_n > K\sigma_{sat,n}$ the estimation $\sigma_{sat,n}$ is considered to be too optimistic. A measurement error is then considered to have been poorly detected in the direction of the observed satellite n, the measurement is therefore rejected. The position is calculated again without this measurement, without this line of sight. The fit of the variance $\sigma_{sat,n}^2$ is evaluated again until the variance is below the threshold value. The aim of this test is to reject any lines of sight that are incompatible, i.e. above the set threshold value. This step Etp33 of rejecting measurements that are incompatible with the estimated error budgets makes it possible to ensure that no rapid variation in the error budget corrupts the position estimations.

Thus, advantageously, the method according to the invention allows the estimation in almost real time of the error budget $\sigma_{sat,n}^2$ to be combined with monitoring of its fit to reality by virtue of a robust algorithm for estimating the position of the receiver terminal and for analyzing the way in which these error budgets correspond to observed residual errors.

The integrity parameters are then calculated using the errors estimated and validated in the preceding steps. The integrity parameters are calculated for example using the conventional method, the standard least squares solution.

The variance of the error in horizontal and vertical position is calculated by projecting the variances of the estimated error onto the local vertical axis and the horizontal plane.

The position equation for V pseudoranges measured with V valid visible satellites is considered to be of the form
Y=A+B·X
where: X is a 1×4 vector representing the North, East, vertical coordinate system position of the receiver/clock offset;
  Y represents the vector of the V pseudorange measurements;
  A the observation matrix V×4 of the direction cosines to each satellite; and
  B the vector of the V pseudorange measurement errors.

The least squares solution of the position equation is considered to be of the form X=MY in which the (4×V) matrix $M=(A^TCA)^{-1}A^TC^{-1}$ is calculated using the measurement error correlation matrix $C=\langle BB^T\rangle$, i.e. $C_{i,j}=(\sigma_{sat,i})^{-2}\delta_{i,j}$.

One particular nonlimiting use related to avionics is now considered. In this field, it is above all the vertical error and horizontal error that are of interest. In civil aviation standards, applications have a maximum tolerable value of horizontal error and vertical error specified by communities of users. These values are generally designated by the acronyms HAL (Horizontal Alert Limit) and VAL (Vertical Alert Limit). According to these standards, these vertical errors (horizontal errors, respectively), i.e. the difference between the actual and estimated positions, must not exceed the VAL limit (HAL limit, respectively) with a probability higher than or equal to a value P that is specified by the requirements of the application. By way of example, in aviation, the value of P is often equal to $1-2\times10^{-7}$.

The distribution of the vertical error is calculated by combining the errors in each line of sight using the formula:

$$\Sigma_V^2 = \sum_{i=1}^{V} M_{i,z}^2 \sigma_{sat,i}^2$$

Likewise, the dispersion of the horizontal errors may be obtained using the formula:

$$\Sigma_H^2 = \frac{1}{2}\sum_{i=1}^{V} M_{i,N}^2 \sigma_{sat,i}^2 + \frac{1}{2}\sum_{i=1}^{V} M_{i,E}^2 \sigma_{sat,i}^2 + \sqrt{\left(\frac{1}{2}\sum_{i=1}^{V} M_{i,N}^2 \sigma_{sat,i}^2 - \frac{1}{2}\sum_{i=1}^{V} M_{i,E}^2 \sigma_{sat,i}^2\right)^2 + \left(\sum_{i=1}^{V} M_{i,N} M_{i,E} \sigma_{sat,i}^2\right)^2}$$

Once these error dispersions have been calculated, it is assumed that a Gaussian type deviation is being dealt with, then non-Gaussian error sources are eliminated before continuing. On the basis of the error budget of each of the lines of sight of each validated satellite that was used to calculate the various positions, the size of a cylindrical volume inside of which the user is sure to be with a probability higher than that required by the civil aviation authorities, is calculated.

If the radius in which the user is located is larger than a HAL or VAL alarm radius, the receiver terminal will consider the position not to be reliable enough and will broadcast an error message. If this is not the case, the calculated position will be considered to be reliable.

The integrity parameters may be determined using two methods. A first way of preceding consists in using the method described in the SBAS MOPS standard by defining a radius of protection that must be smaller than set alert values. These alert values may for example be set for example by the International Civil Aviation Organization (ICAO) in the case of an aeronautical application. A horizontal protection level (HPL) and a vertical protection level (VPL) are calculated as being the maximum horizontal distance (maximum vertical distance, respectively) between the estimated position and the actual position with the probability P. These protection levels may be obtained using the formulae:

$$VPL = K_{P,V} \Sigma_V$$

$$HPL = K_{P,H} \Sigma_H$$

The calculated position will be considered to be sure if the HPL and VPL protection levels are strictly lower than the HAL and VAL alert values.

A second possible implementation consists in directly calculating the risk of exceeding the alert values. This method corresponds to the GALILEO standard.

The integrity risk may be defined as being the probability that the position estimation error is higher than a value X.

For the vertical error, the integrity risk may be obtained using the formula:

$$R_v(X) = \int_{\varepsilon \in ]\infty, -X] \cup [X, \infty[} d\varepsilon\, g_{0,\Sigma_V}(\varepsilon),$$

and for the horizontal error, using the formula:

$$R_h(X) = \int_{\varepsilon^2 \in [X^2/\Sigma H^2, \infty[} X_2, \Sigma_H(\varepsilon^2) d(\varepsilon^2)$$

where $g_{0,\Sigma}(x)$ represents the centered Gaussian distribution of standard deviation $\Sigma$ and $X_2, \Sigma(x)$ represents the $X^2$-distribution with 2 degrees of freedom and parameter $\Sigma$.

The calculated position will be considered to be sure if $$R_v(VAL) + R_h(HAL) < 1 - P$$

The method of the present invention has been described by way of an application to aviation. This example is completely nonlimiting and the method may be applied to any means of transportation such as, for example, maritime navigation or railways. This method may also be used by someone on foot to obtain his precise position, by emergency services for example.

The present invention also relates to a global navigation satellite device able to implement the method described above. This terminal possesses at least one receiver unit able to receive at least one electromagnetic signal emitted by global navigation satellites and the stations of the SBAS augmentation system and at least one processing module.

Advantageously, the method of the present invention allows three elements to be coupled together:
an almost real-time estimation of local errors using operating parameters of the receiver terminal of the user;
a robust algorithm for determining position so as to make it possible to detect underestimations in the estimation of the local errors; and
the use of data from augmentation stations (SBAS), such as EGNOS for example, to weight correctly the satellite contribution to these errors (ARAIM aspect).

One advantage of the present invention is that it allows the cost of ground segments to be decreased by delegating some responsibilities to GNSS receivers. In contrast to the current tendency of sharing allocation between rapid effects and slowly varying effects, the principle behind the invention consists in sharing allocation between local effects (multipath effects, thermal noise, electromagnetic interference, tropospheric error) and global effects (ionospheric error, satellite clock/orbit error). Local effects are monitored by the receiver terminal and global effects are monitored by the system.

The invention claimed is:

1. A method for estimating integrity parameters for global navigation satellite measurements implemented by a global navigation device, the method comprising:
    detecting local errors by said global navigation device; and
    detecting errors associated with global navigation satellites by a ground segment;
    the step of detecting said local errors $\sigma_{loc,i}$, comprising:
    a step Etp11 of calculating error due to thermal noise;
    a step Etp12 of calculating noise due to multipath effects;
    the local errors being calculated using error due to thermal noise and noise due to multipath effects;
    the method further comprising:
    a step Etp2 of constructing an error budget from the local errors and errors associated with the satellites;
    a step Etp3 of monitoring the error budget for selecting local errors and errors associated with satellites; and a step of calculating integrity parameters using the selected local errors and errors associated with the satellites.

2. The method as claimed in claim 1, wherein the noise due to multipath effects is determined using the formula:

$$\sigma_{MP}^2(t) = \frac{1}{L}\sum_{i=0}^{L} [\varphi_{t-i} - \rho_{t-i}]^2 - \left[\frac{1}{L+1}\sum_{i=0}^{L} [\varphi_{t-i} - \rho_{t-i}]\right]^2$$

where L represents filtering time, $\varphi_t$ represents a phase of a carrier of a signal emitted by the global navigation satellite at a time t, and $\rho_t$ is a phase of a code in which are encrypted parameters of the signal emitted by the global navigation satellite at the time t.

3. The method as claimed in claim 1, wherein the error budget is obtained by quadratic summation of the local errors and errors associated with the global navigation satellites.

4. The method as claimed in claim 1, wherein step Etp2 comprises:
a step Etp21 of accounting for ionospheric error;
a step Etp22 of accounting for tropospheric error;
a step Etp23 of accounting for orbit/clock error; and
a step Etp23 of calculating the error budget.

5. The method as claimed in claim 4, wherein the global navigation device is a bi-frequency device and the ionospheric error is calculated using the formula:

$$\sigma_{ionofree} = \sqrt{\frac{\omega_1^4 \sigma_{loc,1}^2 + \omega_2^4 \sigma_{loc,2}^2}{(\omega_1^2 - \omega_2^2)^2} + \sigma_{HOI}^2}$$

where $\sigma_{ionofree}$ represents the ionospheric error; $\sigma_{loc,1}$ and $\sigma_{loc,2}$ are local errors, for angular frequencies $\omega_1$ and $\omega_2$, respectively; and $\sigma_{HOI}$ is higher-order errors.

6. The method as claimed in claim 1 wherein step Etp3 comprises:
a step Etp31 of estimating a position of the global navigation device;
a step Etp32 of estimating pseudorange residues; and
a step Ept33 of rejecting measurements incompatible with the estimated error budgets.

7. The method as claimed in claim 1, wherein the integrity parameters are calculated by defining a radius of protection that must be smaller than a preset threshold value.

8. The method as claimed in claim 1, wherein the integrity parameters are determined by calculating directly a risk of exceeding alarm values.

9. The method as claimed in claim 1, wherein the estimations of local errors are validated with a robust algorithm.

10. The method as claimed in claim 1, wherein the calculation of the integrity parameters is carried out on a basis of previously validated estimations.

11. A global navigation system configured to estimate integrity parameters that include errors for global navigation satellite measurements comprising:
a global navigation device configured to detect local errors; and
a ground segment configured to detect errors associated with global navigation satellites,
the system is configured to detect said local errors $\sigma_{loc,i}$, by:
calculation Etp11 of error due to thermal noise;
calculation Etp12 of noise due to multipath effects;
the local errors being calculated using error due to the thermal noise and the noise due to multipath effects;
the system further configured to:
construct Etp2 an error budget from the local errors and errors associated with the satellites;
monitor Etp3 the error budget for selecting local errors and errors associated with satellites; and
calculate integrity parameters using the selected local errors and errors associated with the satellites.

12. A method for estimating integrity parameters that include errors for global navigation satellite measurements implemented by a global navigation device comprising:
detecting local errors with the global navigation device; and
detecting errors associated with global navigation satellites with a ground segment
the step of detecting said local errors $\sigma_{loc,i}$, further comprising:
a step Etp11 of calculating error due to thermal noise;
a step Etp12 of calculating noise due to multipath effects;
calculating the local errors using error due to the thermal noise and the noise due to multipath effects;
the method further comprising:
a step Etp2 of constructing an error budget from the local errors and errors associated with the satellites;
a step Etp3 of monitoring the error budget and selecting local errors and errors associated with satellites; and
a step of calculating integrity parameters using the selected local errors and errors associated with the satellites.

13. The method as claimed in claim 12, wherein the noise due to multipath effects is determined using the formula:

$$\sigma_{MP}^2(t) = \frac{1}{L}\sum_{i=0}^{L} [\varphi_{t-i} - \rho_{t-i}]^2 - \left[\frac{1}{L+1}\sum_{i=0}^{L} [\varphi_{t-i} - \rho_{t-i}]\right]^2$$

where L represents filtering time, $\varphi_t$ represents a phase of a carrier of a signal emitted by the global navigation satellite at a time t, and $\rho_t$ is a phase of a code in which are encrypted parameters of the signal emitted by the global navigation satellite at the time t.

14. The method as claimed in claim 12, wherein the error budget is obtained by quadratic summation of the local errors and errors associated with the global navigation satellites.

15. The method as claimed in claim 12, wherein step Etp2 comprises:
a step Etp21 of accounting for ionospheric error;
a step Etp22 of accounting for tropospheric error;
a step Etp23 of accounting for orbit/clock error; and
a step Etp23 of calculating the error budget.

16. The method as claimed in claim 12, wherein the integrity parameters are calculated by defining a radius of protection that must be smaller than a preset threshold value.

* * * * *